April 28, 1942.  E. C. CLARK ET AL  2,281,234
REAR VIEW MIRROR
Filed June 24, 1940
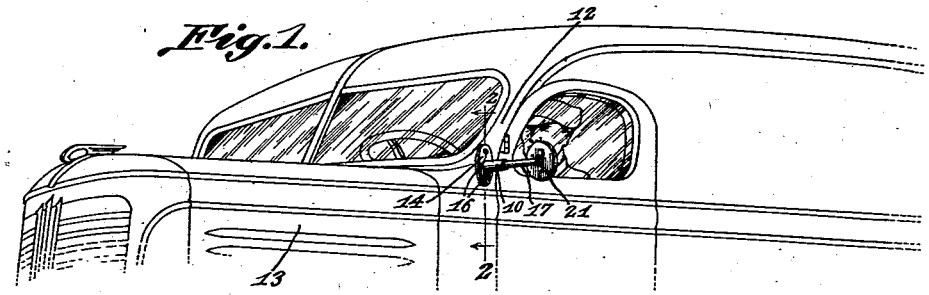
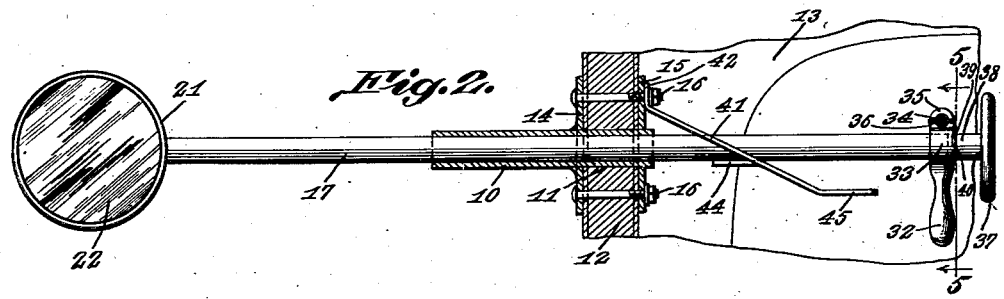
Elvin C. Clark
Harold J. Clark, INVENTORS
BY Victor J. Evans & Co.
ATTORNEYS

UNITED STATES PATENT OFFICE 2,281,234

REAR VIEW MIRROR

Elvin C. Clark and Harold J. Clark, Montour, Iowa

Application June 24, 1940, Serial No. 342,164

4 Claims. (Cl. 88—93)

This invention relates to a rear view mirror and has for an object to provide a device of this character which may be conveniently attached to an automotive vehicle and in use will permit the driver to adjust the mirror without opening the window.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a perspective view of a rear view mirror constructed in accordance with the invention, shown in applied position on an automotive vehicle.

Figure 2 is a longitudinal sectional view of the mirror and its mounting and adjusting means with parts in rear elevation, taken on the line 2—2 of Figure 1.

Figure 3 is a longitudinal sectional view of the rear view mirror and its adjusting means, with parts in top plan.

Figure 4 is a detail cross section view taken on the line 4—4 of Figure 3 showing the mirror in edge elevation.

Figure 5 is a detail cross sectional view taken on the line 5—5 of Figure 2 showing the adjusting handle for the rear view mirror.

Figure 6 is a detail perspective view of the resilient bracket for yieldably holding the mirror in adjusted positions.

Referring now to the drawing in which like characters of reference designate similar parts in the various views, 10 designates a tubular bracket adapted to be engaged through an opening 11 in the window post 12, or other suitable location on a motor vehicle 13. The tubular bracket extends at the inner end interiorly of the vehicle and at the outer end projects exteriorly of the vehicle. A front face plate 14 is secured to the tubular bracket in any preferred manner and a rear face plate 15 is secured to the tubular bracket in any preferred manner. The face plates are arranged respectively on the outer and inner surfaces of the post 12 and are secured to the post by bolts 16 passed through both face plates and through the post.

A tubular arm 17 is slidably mounted in the tubular bracket 10 and is bifurcated at the outer end to provide spaced plates 18, best shown in Figure 3, which receive between them the shank 19 of a T-bracket 20, the alined branches of which are secured to the rear face of the casing 21 of a rear view mirror 22, as best shown in Figure 4.

A pivot pin 23 is passed through both plates 18 and through the shank 19 of the T-bracket 20 to mount the mirror for turning movement about the vertically disposed pivot pin 23 as an axis of rotation, as best shown in Figure 3. A spacing tube 24 is sleeved on the pivot pin between the upper plate 18 and the shank 19 of the T-bracket 20 to space the shank from the upper plate.

A cylinder nut 25, best shown in Figures 3 and 4, is fixed to the shank 19 of the T-bracket, preferably through the medium of a stem 26 formed integral with the bottom face of the nut and engaged through the shank, the stem being headed up as shown at 27 to secure the nut pivotally to the shank.

A rod 28 is mounted longitudinally within the tubular arm 17. A pair of bearing sleeves 29 are disposed in the tubular arm and rotatably mount the rod near its ends in the tubular arm. The outer end of the tubular arm is threaded as shown at 30 in Figure 3 and is engaged through a threaded opening 31 formed in the nut 25. When the rod 28 is turned axially the threaded end thereof will be advanced or retracted through the nut and carry the nut forwardly or rearwardly, and consequently swing the shank 19 of the T-bracket 20 as a unit with the nut to rotate the mirror on the pivot pin 23 as in action for adjusting the mirror on a vertical axis of rotation as shown by dotted lines in Figure 3.

For adjusting the mirror on a horizontal axis of rotation to slant the mirror upwardly or downwardly, the tubular arm 17 is turned in a counter-clockwise or clockwise direction and for this purpose a handle 32 is provided. The handle is provided at its upper end with a split ring clamp 33 which straddles the tubular arm inside of the vehicle, as best shown in Figure 2. The clamp is tightened upon the tubular arm to move as a unit with the handle 32 through the medium of a bolt 34 passed through ears 35 which project from the split ring clamp. The bolt is provided with a wing nut 36 which may be tightened or loosened to tighten or loosen the clamp.

For turning the rod 28 axially to adjust the rear view mirror on the pivot 23, as is best shown in Figure 1, a hand wheel 37 is provided. The hand wheel is provided with a hub 38 which is fixed to the inner end of the rod 28 and is provided with a circumferential groove 39 which receives a retaining ear 40 which projects from opposite sides of the split ring clamp 33 of the handle 32, as best shown in Figures 3 and 5. By turning the hand wheel clockwise, or counter-clockwise, the rod 28 will be correspondingly turned axially and will swing the rear view mirror on the pivot pin 23 and change the outer inclination thereof, as shown by dotted lines in Figure 3.

The tubular arm 17 may be moved outwardly or moved inwardly to adjust the distance of the rear view mirror from the side of the vehicle through the medium of either the hand wheel 37 or handle 32. To yieldably hold the tubular arm in adjusted position a resilient bar 41 is provided at the upper end with an apertured lug 42 which secures the upper securing bolt 16 of the tubular bracket 10, as best shown in Figure 2. The bar inclines downwardly across that portion of the tubular arm within the motor vehicle and is provided with a longitudinal slot 43 to receive the tubular arm 17. A tongue 44 is struck from the bar to form the slot 43 and is integral with the bar at the lower end of the tongue. The tongue extends longitudinally and frictionally engages the underneath side of the tubular arm 17 with spring action. To yieldably hold the tubular arm in adjusted outward or inward position in the tubular bracket 10, the tubular arm is provided at its lower end with a bent grip portion 45 which extends well without and is spaced from the tubular arm 17. The grip may be grasped and moved downward to disengage the spring tongue 44 from the tubular arm to facilitate adjustment of the tubular arm.

Since the operation of the parts has been described as the description thereof progressed, it is thought the invention will be fully understood without further explanation.

What is claimed is:

1. A rear view mirror for motor vehicles comprising, a tubular arm, means for mounting the arm upon a motor vehicle for inward or outward adjustment and oscillating movement, a lever, a pivot mounting the lever at a point between its ends on the outer end of the arm, a mirror secured to one end of the lever, a rod mounted for axial rotation in the arm, a nut swively mounted on the opposite end of the lever from the mirror, the outer end of the rod being threadedly engaged in the nut to swing the lever about a vertical axis of rotation formed by the pivot of the lever to adjust the mirror in a horizontal angular direction, a hand wheel having a hub mounted on the inner end of the rod for turning the rod, and a handle secured to the inner end of the arm for turning the arm on a horizontal axis to adjust the mirror in a vertical angular direction.

2. The structure recited in claim 1 and in which the handle is provided with a split ring clamp secured to the tubular arm, said clamp having a retaining ear fitting in a groove in the hub of the hand wheel to rotatably assemble the hand wheel with the arm.

3. A rear view mirror for motor vehicles comprising, a tubular arm, means for mounting the arm upon a motor vehicle for inward or outward adjustment and oscillating movement, a lever, a pivot mounting the lever at a point between its ends on the outer end of the arm, a mirror secured to one end of the lever, a rod mounted for axial rotation in the arm, a nut swively mounted on the opposite end of the lever from the mirror, the outer end of the rod being threadedly engaged in the nut to swing the lever about a vertical axis of rotation formed by the pivot of the lever to adjust the mirror in a horizontal angular direction, a hand wheel having a hub mounted on the inner end of the rod for turning the rod, a handle secured to the inner end of the arm for turning the arm on a horizontal axis to adjust the mirror in a vertical angular direction, and a spring bar adapted to be secured at one end to the vehicle and having a struck out tongue, said tubular arm projecting through the slot formed by striking out the tongue, said tongue frictionally engaging the tubular arm and preventing accidental displacement thereof from adjusted position.

4. A rear view mirror for motor vehicles, comprising a tubular arm, means for mounting the arm upon a motor vehicle for inward or outward adjustment and oscillating movement, a leaf spring carried by the motor vehicle and surrounding the tubular arm and provided with a spring tongue engaging the periphery of the arm for holding the same in its adjusted position, an intermediately pivoted lever carried by the outer end of the arm, a mirror carried by one end of the lever, a pivoted screw nut carried by the opposite end of the lever, a rod mounted for axial rotation in the arm and having a screw threaded end passing through the nut carried by the lever, means carried by the inner end of the rod for rotating the same, and means carried by the tubular arm for moving the same inwardly or outwardly and also oscillating the same, whereby the mirror has three distinct adjustments.

ELVIN C. CLARK.
HAROLD J. CLARK.